Patented June 8, 1926.

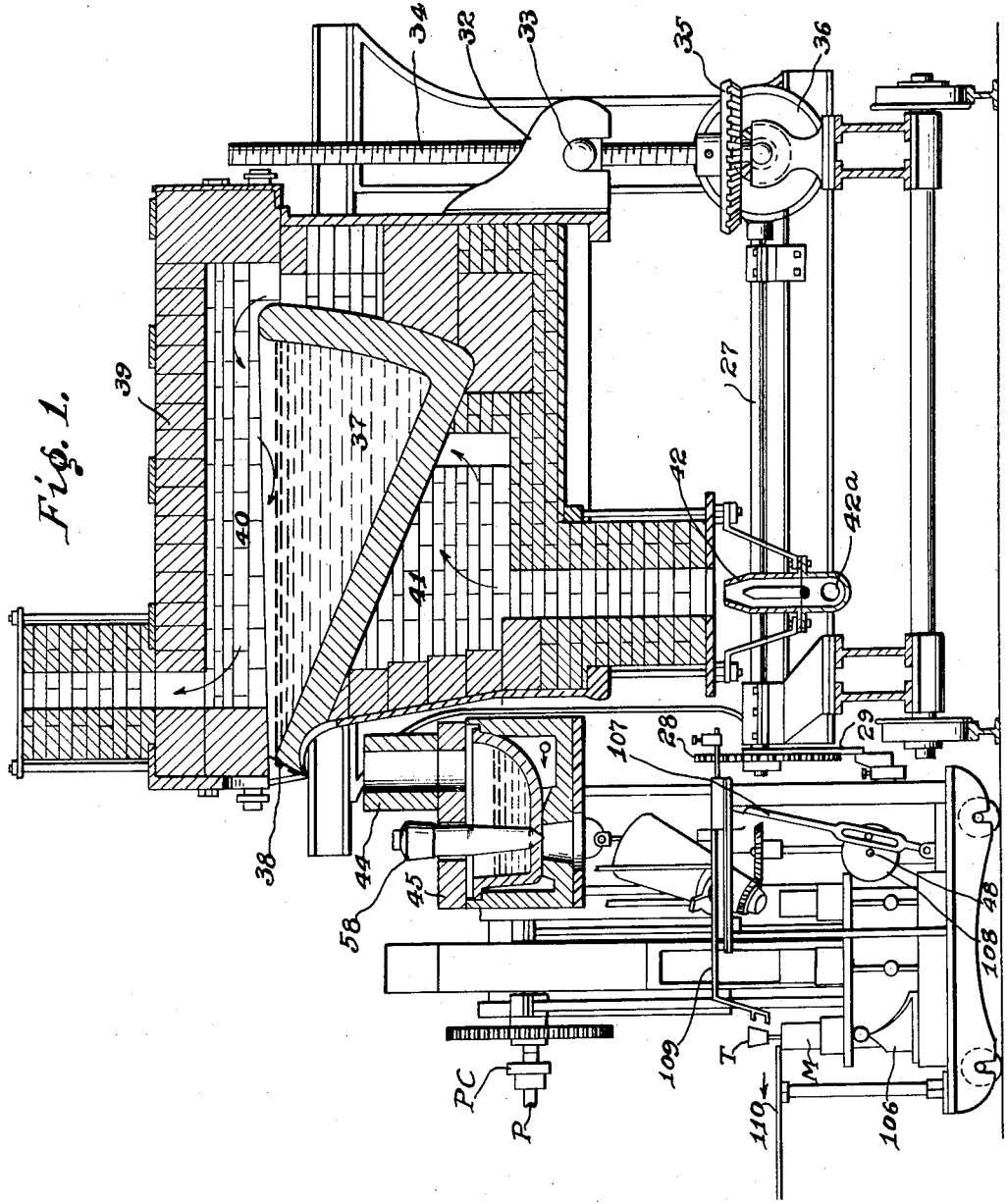

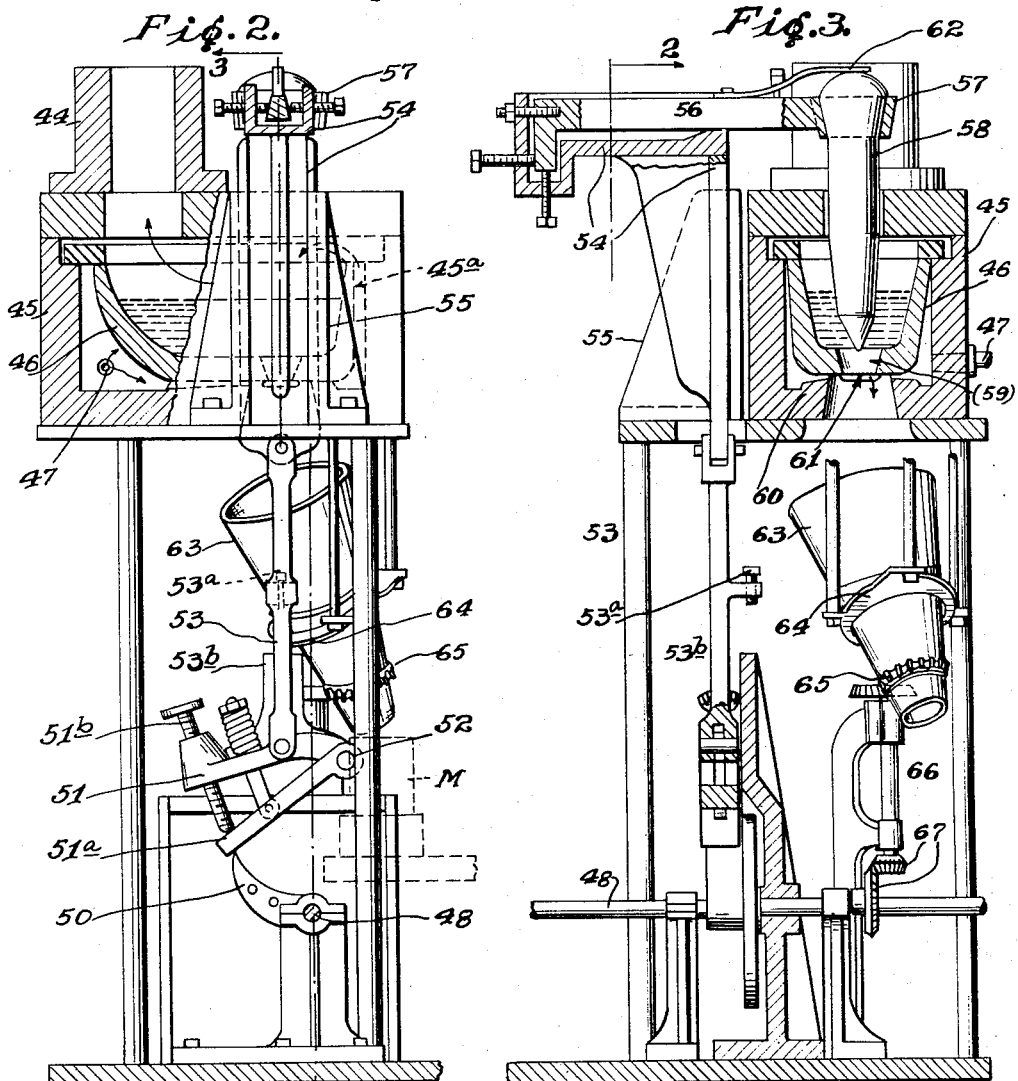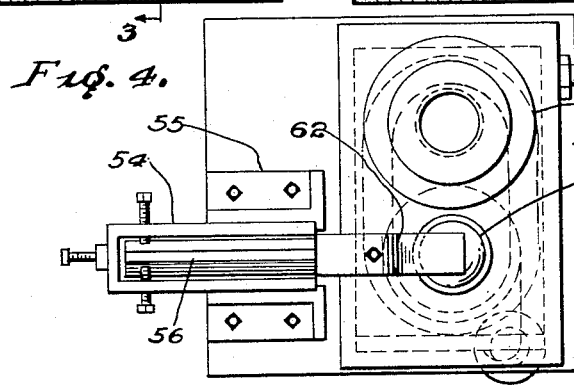

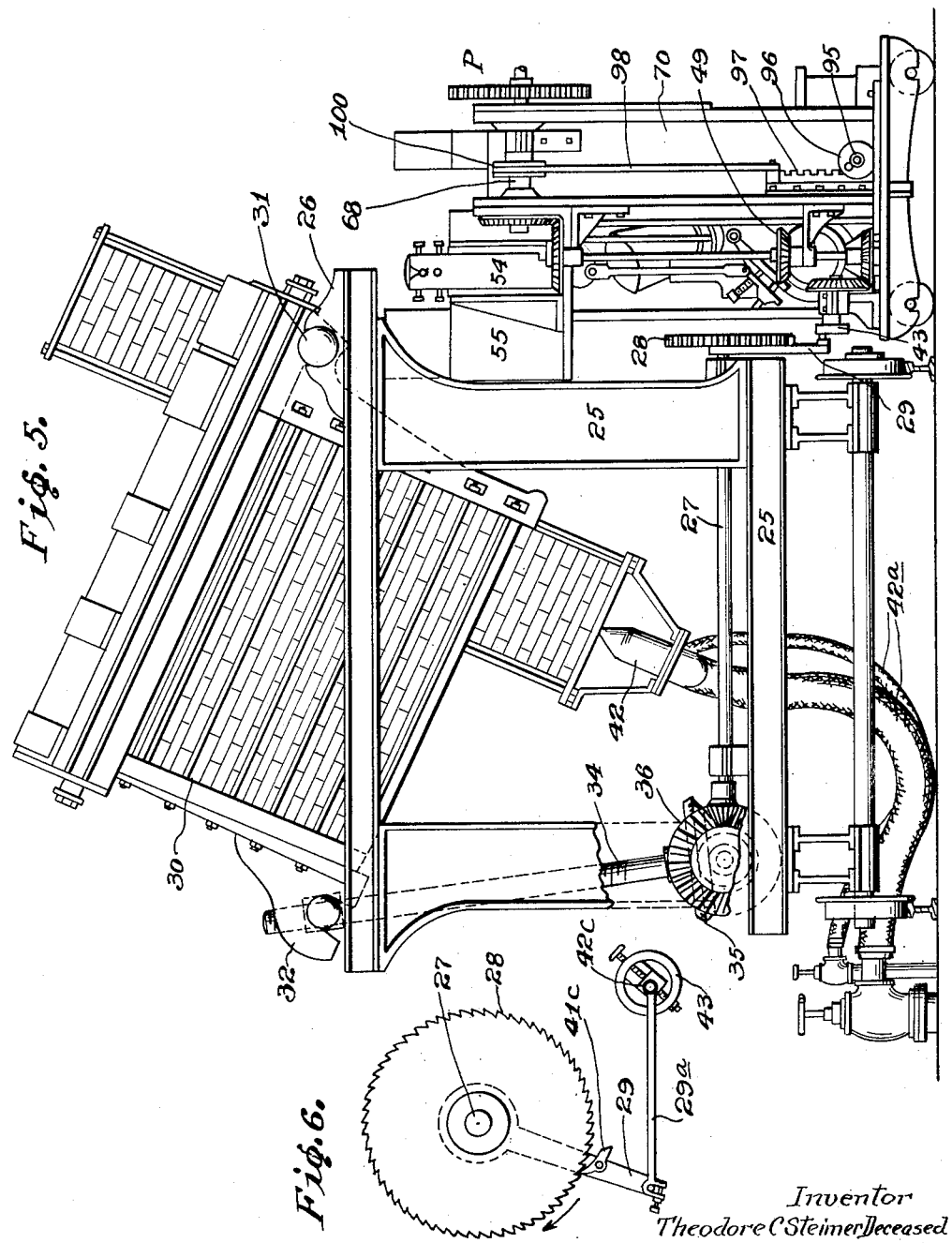

1,588,393

UNITED STATES PATENT OFFICE.

THEODORE C. STEIMER, DECEASED, LATE OF PITTSBURGH, PENNSYLVANIA; BY CHARLES M. STEIMER, EXECUTOR, OF ZANESVILLE, OHIO, ASSIGNOR, BY MESNE ASSIGNMENTS, TO HARTFORD-EMPIRE COMPANY, A CORPORATION OF DELAWARE.

GLASS-FEEDING APPARATUS.

Original application filed February 12, 1910, Serial No. 543,582. Divided and this application filed December 31, 1924. Serial No. 759,173. Substitute for application, Serial No. 753,690, filed December 3, 1924.

The invention claimed in this divisional relates to the art of feeding glass for the manufacture of pressed or blown articles, such as table ware and the like, the primary objects being to improve the construction and operation of the melting furnace to provide for feeding charges to the forming machines, and to provide means suitable for carrying out these purposes, together with other specific improvements which will hereinafter appear.

Referring to the accompanying drawings which are reproductive in part of those filed in the original application aforesaid, and which show, in addition to the features herein claimed, certain matters to be claimed in the aforesaid original application;

Figure 1 is a central vertical section of a furnace, showing a full charge of molten glass therein, also the delivery pot, as invented by Theodore C. Steimer, and a side elevation of a suitable pressing machine.

Figure 2 is a partial side elevation and a partial section showing the mechanism for measuring the glass and feeding the molds, the section being taken partly on the line 2—2 in Figure 3;

Figure 3 is a view, partially in section on the line 3—3 of Figure 2, and partially in elevation, of a different view of the same mechanism;

Figure 4 is a plan view of the glass measuring and feeding pot.

Figure 5 is a side elevation of the melting and pouring furnace tilted into position to entirely empty its charge.

Figure 6 is a detail of the mechanism for operating the tilting of the furnace, as will be hereinafter described.

First, to briefly explain the general nature of the invention, I refer to Figures 1 and 5. Mounted on a truck I show a frame 25, carrying a melting and delivering furnace 30 which is pivoted at 31 and pours out the glass constantly at a fixed head, by reason of its construction and through the agency of the screw 34. The glass flows in an unbroken stream into the interrupter chamber 45, where, by means of a reciprocating interrupter 58 it is divided up into charges which drop through the funnel 63 (see Figures 2 and 3) into a series of molds M on a suitable pressing machine, where the charge of glass is automatically pressed and delivered as shown at T in completed form.

On the frame 25, I provide a stationary bearing 26 and a movable bearing 32 to carry the furnace. All the operations necessary to move the furnace are provided for by a shaft 27 driven by a gear 28 and ratchet arm 29 shown in detail in Figure 6 and hereafter described. It is sufficient at this point to say, that the furnace may be entirely removed by merely disconnecting the air and gas pipes in the usual way, and lifting the driving link 29ª off of its connecting pin on the arm 29. The furnace 30 may be built in any usual construction of iron framing and the outside casing is as customary; but the entire frame and casing are supported on the fixed trunnions 31 at the front of the furnace, and bearing 32 at the rear of the furnace engaging a movable trunnioned nut 33 riding on a pivoted screw 34 which has a bearing in the frame 25 and is rotated slowly and intermittently by gearing 35 and 36 from the shaft 27.

The interior construction of the furnace is peculiar; the melting pot 37 as seen in Figure 1 is of wedge shape, with vertical sides, so that as the furnace is tipped about its pivoting point which corresponds with the line of the pouring mouth 38, the glass is always poured from the same level and from exactly the same position in the furnace. That is, the pouring point is immovable and the whole body of the glass moves around it as a center. By this means I am enabled to drain off the entire charge of glass, leaving no residue to mix with a new charge, which would be very detrimental. The raw material for the glass may be introduced by lifting off the top 39. It will be observed that the pot 37 is in a reverberatory chamber formed by the passages 40 and 41, being heated in any convenient way, as by the air and gas burner 42 fed by any convenient form of piping 42ª.

The pouring of the glass from the furnace 30, accomplished by the slow revolution of shaft 27 and screw 34, is brought about by the reciprocating movement of arm 29, which, as will be seen in Figures 5 and 6, is provided with a dog or ratchet 41°, moved intermittently and moved any desired distance to regulate the flow of glass, by means of link 29ª, engaging an adjustable wrist-pin 42°, set in a revolving wheel 43, geared up, as will be obvious from Figure 5, with the main power shaft P. That is, by attachment to a continually rotating element, the dog and circular rack just described will slowly and continuously tip the furnace about its pouring spout as an axis, so as to deliver a continuous stream of glass at the exact rate required. The adjustment is made without stopping the machine. The glass is always under the same conditions of temperature, pressure head movement, etc., and the entire charge of the furnace is used up.

The stream of glass protected by the hood 44, flows into the interrupter chambed 45 shown in more detail in Figures 1, 2, 3 and 4. This chamber 45 has the double purpose of housing the regulating pot and interrupter, and of keeping the glass uniformly at the correct temperature. Inside the chamber 45, I provide a pot 46 having the peculiar form shown in Figures 2 and 3, so that a gas flame introduced thereunder by a burner 47 reverberates around the pot 46.

Referring to Figures 2 and 3 especially, it will be understood that the shaft 48 may be connected up as by a gear 49 at the right of Figure 5, with the main power shaft P therein; and on the shaft 48 is a cam 50 which reciprocates an arm 51 pivoted at 52 to any convenient part of the frame of the machine. This arm 51 has a bearing portion 51ª, which is adjustable in position by screw 51ᵇ, so as to regulate the throw of the connected vertical reciprocating link 53, imparting motion to a frame 54 which slides in a vertical gude 55. On this frame the interrupter stopper is mounted with various adjustments as shown, by means of the supporting arm 56 having a ring 57 to hold the interrupter stopper 58. This stopper has a conical end which just fits a conical outlet 59 in the pot 46, so that when the stopper is down it approaches closer to the surface of the opening 59 and stops the flow of glass through the same.

The pot 46 of the interrupter is seated on an upwardly projecting boss 60 in the interrupter chamber 45, and this boss is provided with several radial slots 61 through which a fine flame constantly plays under the outlet of the opening 59.

It will be understood that the volume of the flame is sufficiently large to reverberate on top of the pot 46, through the opening 45ª shown in dotted lines in Figure 2.

The amount of glass flowing into the pot 46 being carefully regulated and entering in regular pulsations, the motions of the stopper 58 are timed correspondingly and carefully adjusted in extent so that the same amount of glass which flows into the pot 46, also flows out each time the interrupter is lifted to supply the molds. Thus the level of glass in the pot remains constant, which means that the head or pressure at the outlet is always the same, and the temperature conditions being also constant, the same charge of glass at the same consistency is invariably fed to the molds.

It will be noted that the chamber 45 and the pot 46 constitute a glass-passing member or spout through which, when the device is in operation, glass is constantly passing from the melting compartment or furnace 30 to the feed orifice 59 in the pot; that the side and end walls of such pot are enveloped in flame or heated gases from the burner 47, which, (except for such portion as may escape by the openings 61) are confined around the pot by the channel around the same formed by the side, end, and bottom walls of the chamber 45, that from the burner 47; the flame or gases (as shown by the arrows in Figure 2), after passing from one end of the chamber under and around the side walls of the pot in one direction, pass up into the space over the pot through the space 45ª at the opposite end thereof, and thence flow back over the surface of the glass to and out through the hood 44, which thus serves as a stack for such chamber, and that such gases, as stated, aid in modifying the temperature of glass, and keeping the glass in the pot uniformly at the correct temperature.

No claim is made in this application as to any matter disclosed herein, except to the means for heating the chamber 45, and parts contained therein, and parts necessary for the operation thereof, broader claims and claims on other features being reserved for the aforesaid original application, or for other divisions thereof.

What is claimed as the invention of THEODORE C. STEIMER is:—

1. The method of delivering glass from a source of supply through a spout, which comprises flowing a temperature modifying medium around and in contact with the walls of said spout, and then delivering such fluid into the spout interior above the glass line.

2. A spout for delivering viscous glass from a furnace comprising a body portion with a delivery aperture therein, and a channel in the wall of said body portion for the circulation of a temperature influencing medium, said channel emptying such medium into the space above the glass in said spout.

3. In a spout for feeding viscous glass from a furnace and having a discharge outlet therein, side walls, a substantially vertical conduit in each side wall for delivering a temperature modifying medium to the interior of the spout above the glass level, and means for supplying such temperature modifying medium to said conduits.

4. In spout structure for delivering viscous glass, a glass trough, a U-shaped channel member for the reception of a temperature modifying medium, the vertical legs of said U-shaped channel member extending upwardly through the vertical side walls of said spout and passing through the sides of the spout above the glass line for the delivery of said medium into the spout above the glass.

5. In a spout for delivering viscous glass from a furnace, a channel in the wall of the spout for delivering a temperature modifying fluid into the interior of said spout above the glass line, said channel directing the fluid first in one direction and then in another.

6. Apparatus for feeding molten glass, comprising a glass passing member having an outlet through which glass is delivered, and means for flowing a temperature-modifying medium in contact with said member, and for delivering such medium into the interior of said member above the glass line.

7. Apparatus for feeding molten glass, comprisng a melting compartment, a glass passing member receiving glass therefrom at one end, and having a discharge outlet at the other, and a channel for conducting temperature modifying fluid in contact with said member, the said channel being arranged to empty said fluid into the space above the glass in said member.

8. Apparatus for feeding molten glass, comprising a melting compartment, a glass passing member receiving glass therefrom at one end, and having a discharge outlet at the other, and means for conducting heating gases upwardly in contact with the sides of said member and for emptying said gases into said member above the glass line.

9. Apparatus for feeding molten glass, comprising a melting compartment, a glass passing member receiving glass therefrom at one end and having a discharge outlet at the other, a substantially vertical conduit for conducting temperature-modifying fluid in contact with the sides of said member, and for emptying said gases into said member above the glass line, and means for supplying such temperature modifying medium to said conduit.

10. Apparatus for feeding molten glass, comprising a melting compartment, a glass passing member receiving glass therefrom at one end having a downwardly opening discharge outlet at the other, a burner, means for conducting heating gases from said burner upwardly in contact with the side walls of said member, and for emptying said gases into said member above the glass line, and a chimney above said glass passing member for permitting the escape of said gases therefrom.

11. Apparatus for feeding molten glass, comprising a glass melting furnace, a glass-passing member receiving glass therefrom at one end and having a downwardly opening discharge outlet near the other end, a burner arranged to introduce heating gases into the interior of said glass-passing member near its discharge end, means for removing heating gases from said glass melting furnace, and independent means for removing heating gases from said glass-passing member near its glass-receiving end.

12. Apparatus for feeding molten glass, comprising a glass melting furnace, a covered feeding chamber having its interior separated from the interior of said furnace, said feeding chamber being arranged to receive molten glass from said furnace and having a downwardly directed discharge outlet, a movable implement extending through the cover of said chamber for controlling the discharge of glass from said outlet, means for introducing heating gases into said furnace, separate and independent means for introducing heating gases into the interior of said feeding chamber, means for removing heating gases from said furnace, and separate means for removing heating gases from said feeding chamber independently of the means for removing heating gases from said furnace.

In testimony whereof I hereunto affix my signature this 24th day of December, 1924.

CHARLES M. STEIMER,
*Executor of Theodore C. Steimer, deceased.*